No. 685,313. Patented Oct. 29, 1901.
R. S. WHITE.
ELECTRICITY METER.
(Application filed Jan. 30, 1901.)
(No Model.) 2 Sheets—Sheet 1.
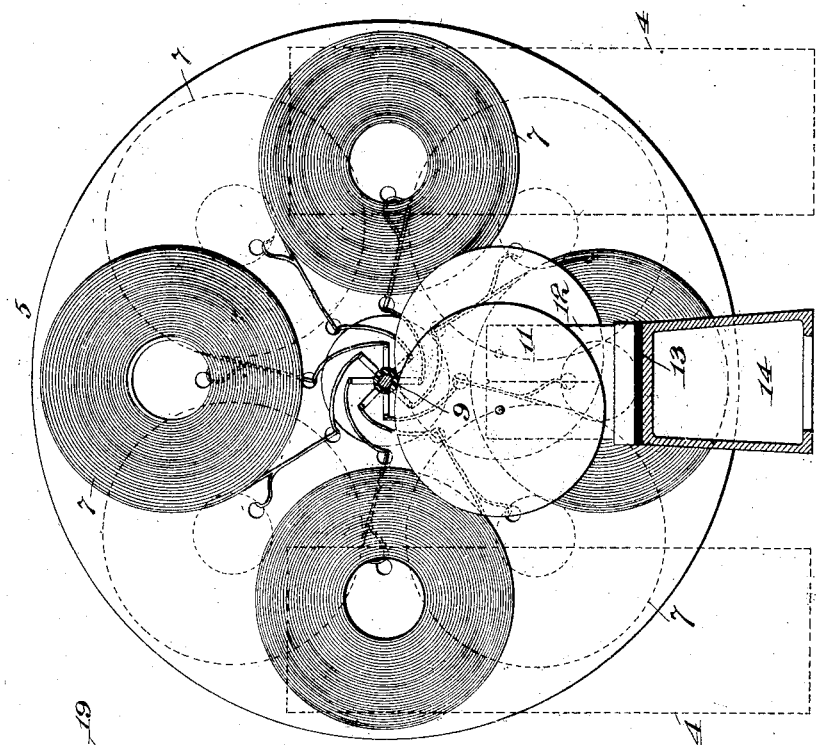
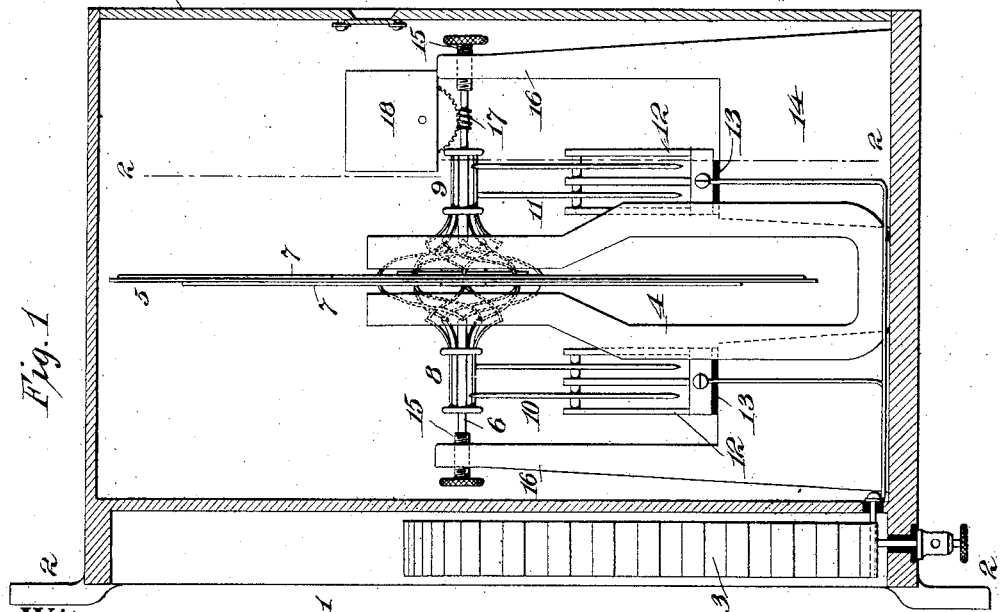
Witnesses: Inventor
Roger Sherman White
by Dyer Edmonds & Dyer
Att'ys.

No. 685,313. Patented Oct. 29, 1901.
R. S. WHITE.
ELECTRICITY METER.
(Application filed Jan. 30, 1901.)
(No Model.) 2 Sheets—Sheet 2.
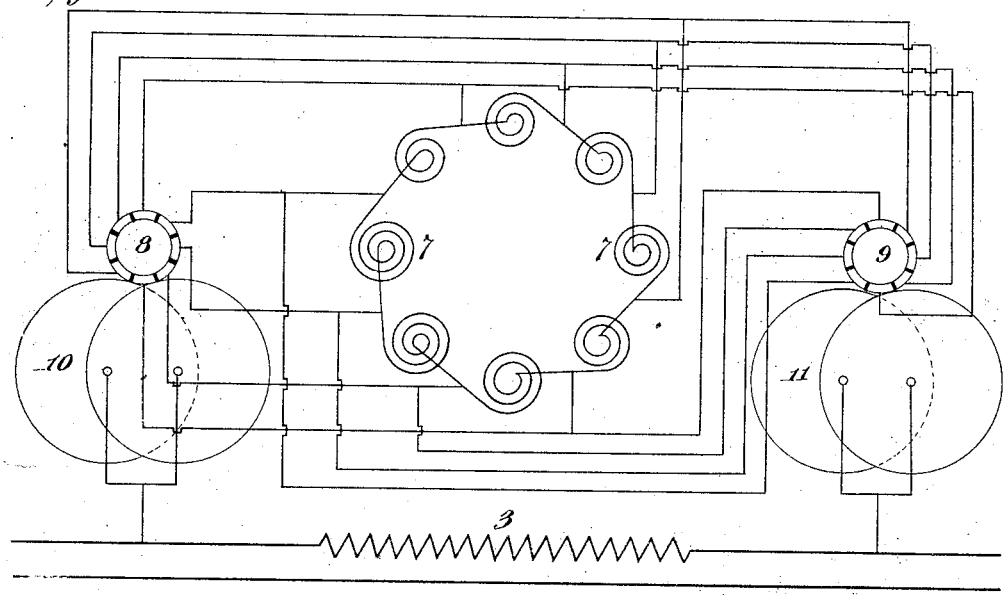
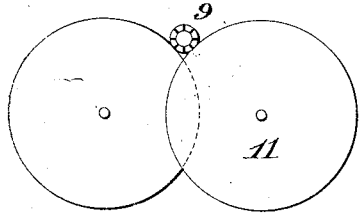 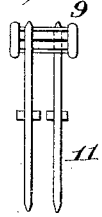 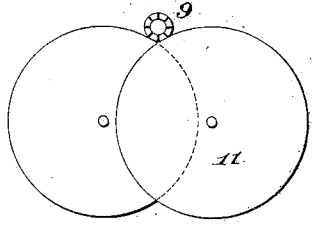 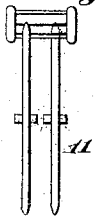
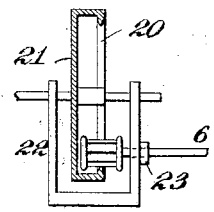
Witnesses:
Jas. F. Coleman
Archibald S. Reese
Inventor
Roger Sherman White
by Dyer Edmunds Dyer
Att'ys.
THE NORRIS PETERS CO., PHOTO-LITHO., WASHINGTON, D. C.

UNITED STATES PATENT OFFICE.

ROGER SHERMAN WHITE, OF CHICAGO, ILLINOIS, ASSIGNOR OF ONE-FIFTH TO WILLIAM J. REAST, OF BROOKLYN, NEW YORK.

ELECTRICITY-METER.

SPECIFICATION forming part of Letters Patent No. 685,313, dated October 29, 1901.

Application filed January 30, 1901. Serial No. 45,323. (No model.)

*To all whom it may concern:*

Be it known that I, ROGER SHERMAN WHITE, a citizen of the United States, residing at Chicago, county of Cook, and State of Illinois, have invented a certain new and useful Improvement in Electricity-Meters, of which the following is a specification.

My invention relates to certain improvements in electricity-meters, and the type of meters to which the invention specifically relates is that employing a motor the speed of which is directly proportional to the current to be measured and whose armature connects with and drives a suitable register. In order that meters of this type may be sufficiently accurate for the purpose, it is necessary that the element of friction should be reduced to the minimum, and it is the present practice with these meters to mount the lower end of the armature-shaft on a suitable jewel and to use collecting-brushes which bear very lightly on the commutator. The use of a jewel in these meters is expensive and objectionable, since the jewel is likely to be cracked by any sudden jars tending to drive the armature downward. Commutator-brushes are also objectionable, since their friction compared to the very slight currents which sometimes require to be measured is relatively great, and which, furthermore, generally increases with wear, since the material of which the commutators are most generally made (silver) tends to flake or scale under the constant attrition.

The object of my invention is to provide and produce an electricity-meter of this type wherein the objections indicated may be overcome; and to this end the invention consists in horizontally supporting the armature of the motor by means of a relatively frictionless bearing, which also operates as a collecting device and on which the armature by its weight normally seats itself, so that any tendency of the armature to move laterally will be resisted by gravity.

In order that the invention may be better understood, attention is directed to the accompanying drawings, forming a part of this specification, and in which—

Figure 1 is an elevation of the preferred form of meter wherein two poles are used, showing the register in elevation and casing in section; Fig. 2, a section on the line 2 2 of Fig. 1; Fig. 3, a diagram of the circuits; Figs. 4 and 4$^a$, front and side views, respectively, of the bearing for one of the commutators when four poles are used; Figs. 5 and 5$^a$, front and side views, respectively, of a further modification of the bearing; and Fig. 6, a sectional view through the armature-shaft, illustrating a still further modification wherein only a single rolling-surface at each end is employed.

In all of the above views corresponding parts are represented by the same numerals of reference.

1 represents a suitable back or support having lugs 2, by which it may be secured in position, and being formed, preferably, with a chamber on its interior, as shown, for the reception of the shunting resistance 3, so that any heat generated by the latter will not influence the meter. The shunt 3 is included in series with one of the mains and permits a definite proportion of current to operate the motor in the usual way. Preferably the motor comprises two or more field-magnets 4, between which rotates the disk 5, carried on a shaft 6. The disk 5 supports the armature-coils 7 on both sides thereof, as shown, which coils are connected together and to the segments of two commutators 8 and 9, as shown. Referring to Fig. 3, it will be seen that the bottom section of the commutator 8 is connected to the top section of the commutator 9, and so on, so that a collecting device in simultaneous contact with the bottom section of each of the commutators will operate the motor in exactly the same way as if there were two collecting devices coöperating diametrically with a single commutator. The disk 5, in addition to supporting the coils, may and preferably does also operate as a damping or retarding device, whereby a definite proportional load will be at all times imposed upon the motor, as is common in the art; but other arrangements of resisting devices may obviously be employed for the purpose.

The commutators 8 and 9 are supported on roller-bearings 10 11, as shown. Each of the roller-bearings 10 and 11 comprises a disk the outer edge of which is beveled, as shown, the periphery being rounded for engagement with and support of the two commutators. These bearings are supported in pedestals 12, which in turn are carried upon insulating-blocks 13 from a suitable base 14, the latter being supported by the back 1, as shown. The disks 10 10 and 11 11, constituting each roller-bearing, are preferably arranged so as to form a relatively obtuse angle at their upper surfaces, into which the commutators of the motor will be received, whereby each set of disks 10 10 and 11 11 operate as collecting devices for coöperation with the commutators. It will, however, be obvious that the disks may be further separated, as shown in Fig. 5, so that each engages its respective commutator about sixty degrees apart, in which case one of said disks for each bearing will operate as a collecting device, the other being insulated and not being connected in the circuit. On the other hand, as shown in Fig. 4, the disks may be separated so as to engage the commutators at ninety degrees apart, in which case each disk may operate as a separate collecting device, it being understood, of course, that four poles will be used instead of two, as explained. I prefer, however, to arrange the disks comprising the roller-bearings as shown in Figs. 1 and 2, as in this way they both coöperate to form a collecting device for the particular commutator with which they coöperate, the angle between the peripheries of the disks being sufficiently obtuse to enable the commutator to be received near the apex thereof, so that both disks will be always in contact with the same commutator-plate or with adjacent commutator-plates.

In order to prevent the armature from being displaced, I preferably make use of retaining-bearings 15, carried by posts 16, and the cups of which may, if desired, be provided with jewels for reducing the friction in case either end of the armature-shaft should engage therewith. The retaining-bearings ordinarily perform no function in supporting the armature-shaft, and their principal utility is to prevent dislodgment of the armature during transportation.

The armature-shaft may be provided with a worm 17, driving a suitable counter or register 18, observable from the outside of a case 19, the latter being, preferably, hermetically sealed over the meter, so as to exclude all dust and dirt.

Instead of making use of a roller-bearing comprising at least two disks at each end, it will be obvious that any other form of roller-bearing may be employed wherein the armature by its weight is normally seated in position so that any tendency toward lateral movement will be resisted by gravity. Thus in Fig. 7 the shaft 6 is illustrated as being supported upon a rim 20, formed on disks 21, the shafts of which are mounted in pedestals 22. The armature-shaft 6 passes through one of the pedestals and may be provided with a collar 23 for preventing endwise movement.

It will be obvious that by supporting the armature of a motor-meter on roller-bearings the supporting friction will be reduced to a minimum, while the friction now due to the engagement of stationary collecting devices with rotating commutators in meters of this type at present in use will be entirely overcome.

Having now described my invention, what I claim as new, and desire to secure by Letters Patent, is as follows:

1. In an electricity-meter, a rotatable armature influenced by the current to be measured, two commutators for said armature on either side thereof, and a roller-bearing with which each commutator engages, the bearings acting as collecting devices for the commutators, substantially as set forth.

2. In an electricity-meter, a rotatable armature influenced by the current to be measured, two commutators for said armature on either side thereof, and a roller-bearing for supporting the armature, comprising a pair of disks coöperating with each commutator and acting as collecting devices therefor, substantially as set forth.

3. In an electricity-meter, the combination of an armature influenced by the current to be measured, two commutators for said armature, and two antifriction-disks with which each commutator engages, the shafts of each set of disks being arranged relatively close together, so that the engaging point between each disk and the commutator will be adjacent to the engaging point of the corresponding disk and the commutator, substantially as set forth.

4. In an electricity-meter, a rotatable armature influenced by the current to be measured, two commutators for said armature on either side thereof, a roller-bearing with which each commutator engages, the bearings acting as collecting devices for the commutators, and end bearings limiting longitudinal movement of the armature, substantially as set forth.

5. In an electricity-meter, a rotatable armature influenced by the current to be measured, two commutators for said armature on either side thereof, a roller-bearing for supporting the armature, comprising a pair of disks coöperating with each commutator and acting as collecting devices therefor, and end bearings limiting longitudinal movement of the armature, substantially as set forth.

6. In an electricity-meter, the combination of an armature influenced by the current to be measured, two commutators for said armature, two antifriction-disks with which each commutator engages, the shafts of each set of disks being arranged relatively close together, so that the engaging point between each disk and the commutator will be adjacent to the engaging point of the corresponding disk and the commutator, and end bearings limiting longitudinal movement of the armature, substantially as set forth.

This specification signed and witnessed this 22d day of January, 1901.

ROGER SHERMAN WHITE.

Witnesses:
C. C. WALTENBAUGH,
MELANCTHON R. NYMAN.